Patented Apr. 24, 1928.

1,667,239

UNITED STATES PATENT OFFICE.

ANDRÉ BLANKART, OF BASEL, SWITZERLAND, ASSIGNOR TO THE HOFFMANN-LA ROCHE CHEMICAL WORKS, OF NEW YORK, N. Y., A CORPORATION OF NEW YORK.

ALKYL DERIVATIVES OF DIPHENOLISATINE AND PROCESS FOR MAKING SAME.

No Drawing. Application filed July 7, 1927, Serial No. 204,150, and in Switzerland October 9, 1926.

Until now it was supposed that the action of phenol-like laxatives was due to the presence of one or several free or but slightly blocked hydroxyl groups (Kaufmann "Beitrag zur Theorie der Laxantia", Pharmaceutische Zeitung, No. 77, 1926, p. 1202).

It has now been found that the alkyl derivatives of diphenolisatine, which possess blocked and not easily saponified hydroxyl groups, are excellent laxatives with a reliable and constant action even in very small doses. For the blocking of the hydroxyls alkyl groups, such as the methyl, the ethyl, the methylphenyl group, are used.

For the manufacture of the alkyl derivatives of diphenolisatine, diphenolisatine is treated with the usual alkylating agents. In this manner the alkyl derivatives of diphenolisatine are obtained with a very good yield and in pure form. According to the manufacturing conditions O-dialkyl compounds or O-dialkyl-N-alkyl compounds are formed. Gradual alkylizing is also possible by transforming the O-dialkyl compounds first obtained into O-dialkyl-N-alkyl compounds. Mixed alkyl compounds may further be obtained. By acetylizing the O-dial compounds are transformed into N-acetyl compounds.

The alkyl derivatives of diphenolisatine are crystallizing, neutrally reacting, very constant compounds which with ferricyanate of potassium and a solution of sodium hydroxide show no colour reaction. In water, alkali and acids they are insoluble, but dissolve easily in the usual organic solvents, alcohol, benzol, concentrated acetic acid and the like.

Example 1.

96 gravimetrical parts of diphenolisatine are dissolved in a solution of 24.6 gravimetrical parts of caustic sodium in 180 gravimetrical parts of water and while cooling 78 gravimetrical parts of dimethylsulphate are slowly added. When the precipitate has become solid the liquid is filtered off and the product washed with a solution of sodium hydroxide and water and crystallized from alcohol. Di-anisol-isatine is thus obtained in fine prisms melting at 117–118° C. By boiling with acetic acid anhydride and sodium acetate it is transformed into N-acetyl-di-anisol-isatine melting at 153° C. The following formulas illustrate the products of this example:

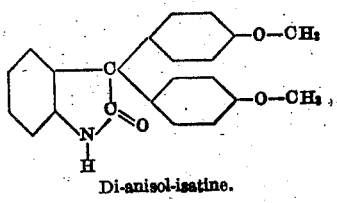
Di-anisol-isatine.

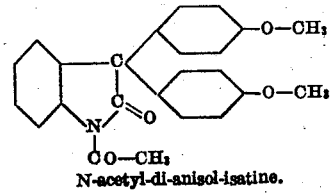
N-acetyl-di-anisol-isatine.

Example 2.

32 gravimetrical parts of diphenolisatine are dissolved in a solution of 12 parts of caustic sodium in 60 gravimetrical parts of water; to the hot solution 40 gravimetrical parts of dimethylsulphate are slowly added, heating being continued over a water-bath. After an hour the reaction product is cooled, filtered and crystallized from alcohol. N-methyl-di-anisol-isatine is obtained as a crystallized powder melting at 152° C.

The same compound is obtained by boiling 10 gravimetrical parts of di-anisol-isatine in a solution of 1.6 gravimetrical parts of caustic sodium in 30 gravimetrical parts of water during an hour with a reflux condenser and adding at the same time 3.7 gravimetrical parts of dimethylsulphate.

The following formula illustrates the product of this example:

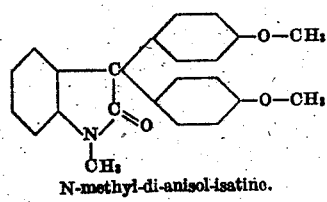
N-methyl-di-anisol-isatine.

Example 3.

6.3 gravimetrical parts of diphenolisatine are dissolved in 50 gravimetrical parts of alcohol and heated with a solution of 2.4 gravimetrical parts of caustic sodium in 50 gravimetrical parts of water and 5 gravimetrical parts of ethyl-iodide during 2 hours to about 60° C. with a reflux condenser. The alcohol is then distilled off, the reaction product diluted with water, the precipitate filtered, repeatedly washed with dilute solution of sodium hydroxide and crystallized from concentracted acetic acid. Di-phenetol-isatine is obtained as a micro-crystalline powder melting at 60° C. The following formula illustrates the product of this example:

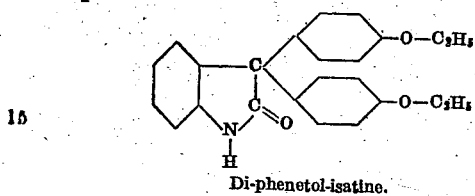

Di-phenetol-isatine.

*Example 4.*

11.3 gravimetrical parts of di-guaiacol-isatine are dissolved in a solution of 3.7 gravimetrical parts of caustic potassium in 50 gravimetrical parts of water, and the solution thus obtained is shaken during several hours with 10.5 gravimetrical parts of benzyl-bromide. The mixture is then heated for a short time to about 50° C., during which process the reaction product clogs together and when cooling becomes solid. It is filtered, washed with a solution of sodium hydroxide and crystallized from benzine.

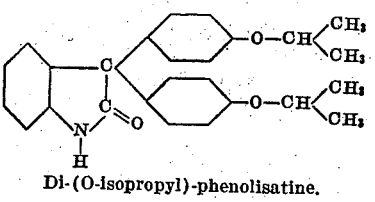

Di-(O-isopropyl)-phenolisatine.

I claim:

1. As new products the alkyl derivatives of diphenolisatine which may be produced by treating diphenolisatine with an alkylating agent, the new products being crystallizing, neutrally reacting, very constant compounds showing with ferricyanate or potassium and a solution of sodium hydroxide no colour-reaction, and being insoluble in water, alkali and acids, but dissolving easily in the usual organic solvents, alcohol, benzol, concentrated acetic acid and the like.

2. As a new product di-phenetol-isatine which may be produced by treating diphenolisatine with an ethylating agent, the new product being obtained as a micro-crystalline powder melting at 60° C., showing with ferricyanate of potassium and a Di-(O-benzyl)-guaiacol-isatine is obtained in fine needles melting at 104° C. The following formula illustrates the product of this example:

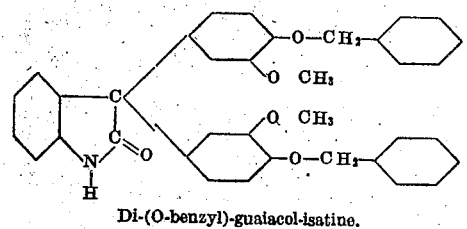

Di-(O-benzyl)-guaiacol-isatine.

*Example 5.*

20 gravimetrical parts of diphenolisatine are dissolved in a solution of 5 gravimetrical parts of caustic sodium in 100 gravimetrical parts of water and after the addition of 15.6 gravimetrical parts of isopropyl-bromide heated during 2 hours with a reflux condenser, whereby the product becomes solid. After cooling the mixture is filtered, washed with dilute solution of sodium hydroxide and finally re-crystallized from concentrated acetic acid. Di-(O-isopropyl)-phenolisatine thus obtained melts at 237–238° C. By acetylizing with acetic acid anhydride and sodium acetate N-acetyl-di-(O-isopropyl)-phenolisatine, melting at 145–146° C., is obtained. The following formulas illustrate the products of this example:

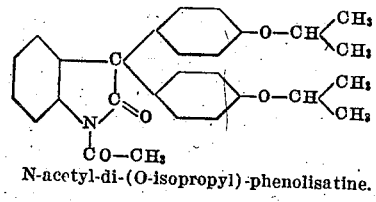

N-acetyl-di-(O-isopropyl)-phenolisatine.

solution of sodium hydroxide no colour-reaction, and being insoluble in water, alkalis and acids, but dissolving easily in the usual organic solvents, alcohol, benzol, concentrated acetic acid and the like.

3. The process for the manufacture of alkyl derivatives of diphenolisatine which consists in treating diphenolisatine with an alkylating agent.

4. The process for the manufacture of di-phenetol-isatine which consists in treating di-phenolisatine with an ethylating agent.

5. The process for the manufacture of di-phenetol-isatine which consists in treating diphenolisatine with ethyl-iodide.

In witness whereof I have hereunto set my hand.

A. BLANKART.